Patented May 19, 1942

2,283,211

UNITED STATES PATENT OFFICE 2,283,211

QUINOLINE-AZO COMPOUNDS

William S. Jones and William Braker, Brooklyn, N. Y., assignors to E. R. Squibb & Sons, New York, N. Y., a corporation of New York No Drawing. Application December 23, 1939, Serial No. 310,831

5 Claims. (Cl. 260—155)

This invention relates to, and has for its object the provision of: I, azo bases of the general formula

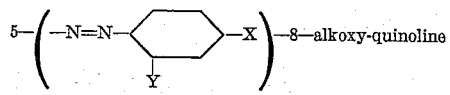

wherein X represents hydroxy or (preferably) amino, and Y represents hydrogen, alkyl, aryl, hydroxy, alkoxy, or (preferably) amino; and II, acid-addition salts of these azo bases.

These azo compounds are promising chemotherapeutic agents for the treatment of pyelitis, urethritis, prostatitis, cystitis, and other acute and chronic infections of the genito-urinary tract. The acid-addition salts of the azo bases are water-soluble, and may be administered orally.

These azo bases may be prepared by diazotizing a 5-amino-8-alkoxy-quinoline, especially a 5-amino-8-[(lower alkyl)-oxy]-quinoline—inter alia, 5-amino-8-ethoxy-quinoline and 5-amino-8-butoxy-quinoline—and coupling the diazonium salt obtained with a compound of the general formula

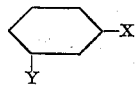

wherein X and Y have the meaning given hereinbefore—inter alia, m-phenylene diamine, m-phenetidine, aniline, phenol, resorcinol, m-cresol, m-phenyl-phenol, and m-toluidine.

The azo bases may be converted into acid-addition salts by reacting the base with the appropriate acid in a solvent, e. g., alcohol or acetone, and recovering the salt formed, e. g., by evaporating the solvent. The acids utilizable for preparation of such salts comprise inter alia, hydrochloric, sulfuric, boric, tartaric, lactic, citric, and malic acids.

The following examples are illustrative of the invention:

EXAMPLE 1

*5-(2',4'-diamino-phenylazo)-8-ethoxy-quinoline*

1.4 g. of 5-amino-8-ethoxy-quinoline is dissolved in 20 cc. of water containing 7 cc. of concentrated hydrochloric acid, and diazotization is effected at 0° C. with a solution of 0.38 g. of sodium nitrite in 10 cc. of water; then 0.775 g. of m-phenylene-diamine hydrochloride dissolved in 15 cc. of water is added to the solution of the diazonium salt at 0° C., the mixture is stirred vigorously for ten minutes, and the coupling reaction is allowed to proceed at 20° C. for two hours. The solution is made ammoniacal, and the precipitate is collected, washed with water, and dried in a vacuum to yield 0.8 g. of a red base having the formula $C_{17}H_{17}N_5O$.

The hydrochloride ($C_{17}H_{18}N_5OCl$) is obtained by adding 2.33 cc. of normal hydrochloric acid to a solution of 0.8 g. of the base in acetone, and evaporating the solution to dryness.

EXAMPLE 2

*5-(2',4'-diamino-phenylazo)-8-butoxy-quinoline*

12.0 g. of 8-butoxy-quinoline is added in small portions and with constant stirring for fifteen minutes to 45 cc. of nitric acid (density 1.5) at 0° C.; the mixture is then vigorously agitated at 0° C. for ten minutes, heated on a steam bath for twenty minutes, and poured into 170 cc. of water. Precipitation is effected by alkalinizing the diluted solution, and the precipitate is collected, washed with water, and dried in a vacuum to yield 10.2 g. of 5-nitro-8-butoxy-quinoline, having a melting point of 111–112° C.

5.0 g. of this intermediate is dissolved in 20 cc. of concentrated hydrochloric acid contained in 25 cc. of water and the solution is heated to 90° C. and added to a solution of 12.5 g. of stannous chloride in 35 cc. of water; the mixture is then heated on a steam bath for 45 minutes, cooled, the tin precipitated with hydrogen sulfide, the tin sulfide filtered off, and the filtrate is concentrated. Precipitation is effected by cooling the concentrated filtrate, and the precipitate is collected, washed with cold 1:1 hydrochloric acid, and dried in a vacuum to yield 5-amino-8-butoxy-quinoline dihydrochloride, having a melting point of 255–256° C.

1.2 g. of 5-amino-8-butoxy-quinoline dihydrochloride is dissolved in 25 cc. of water and 5 cc. of concentrated hydrochloric acid, and diazotization is effected at 0° C. with a solution of 0.5 g. of sodium nitrite in 10 cc. of water, 1 g. of urea being finally added to destroy any excess of nitrous acid. Then 0.6 g. of m-phenylene-diamine hydrochloride dissolved in 8 cc. of water is added to the solution of the diazonium salt at −5° C., and the coupling reaction is allowed to proceed at −5° C. for two hours and at 5° C. for twelve hours. Precipitation is effected with ammonia water, and the precipitate is collected, washed with water, and dried in a vacuum to yield a red azo base having the empirical formula $C_{19}H_{21}N_5O$ The hydrochloride ($C_{19}H_{22}N_5OCl$) is obtained by adding the theoretical quantity of hydrochloric acid to an alcoholic solution of the base, and evaporating the solution to dryness.

The invention may be variously otherwise embodied within the scope of the appended claims.

We claim:

1. A compound of the group consisting of: azo bases of the general formula

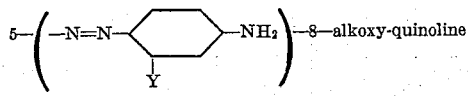

wherein Y represents a member of the group consisting of hydrogen, alkyl, phenyl, hydroxy, alkoxy, and amino; and acid-addition salts thereof.

2. An acid-addition salt of an azo base of the general formula

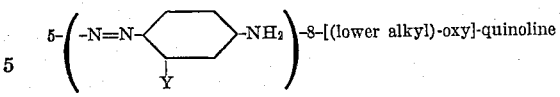

wherein Y represents a member of the group consisting of hydrogen, alkyl, phenyl, hydroxy, alkoxy, and amino.

3. An acid-addition salt of an azo base of the general formula 5-(2',4'-diamino-phenylazo)-8-[(lower alkyl)-oxy]-quinoline.

4. An acid-addition salt of 5-(2',4'-diamino-phenylazo)-8-ethoxy-quinoline.

5. An acid-addition salt of 5-(2',4'-diamino-phenylazo)-8-butoxy-quinoline.

WILLIAM S. JONES.
WILLIAM BRAKER.